G. T. VOORHEES.
CONCENTRIC CIRCULAR CELL ICE MAKING APPARATUS.
APPLICATION FILED APR. 15, 1908.
984,052.
Patented Feb. 14, 1911.
2 SHEETS—SHEET 1.
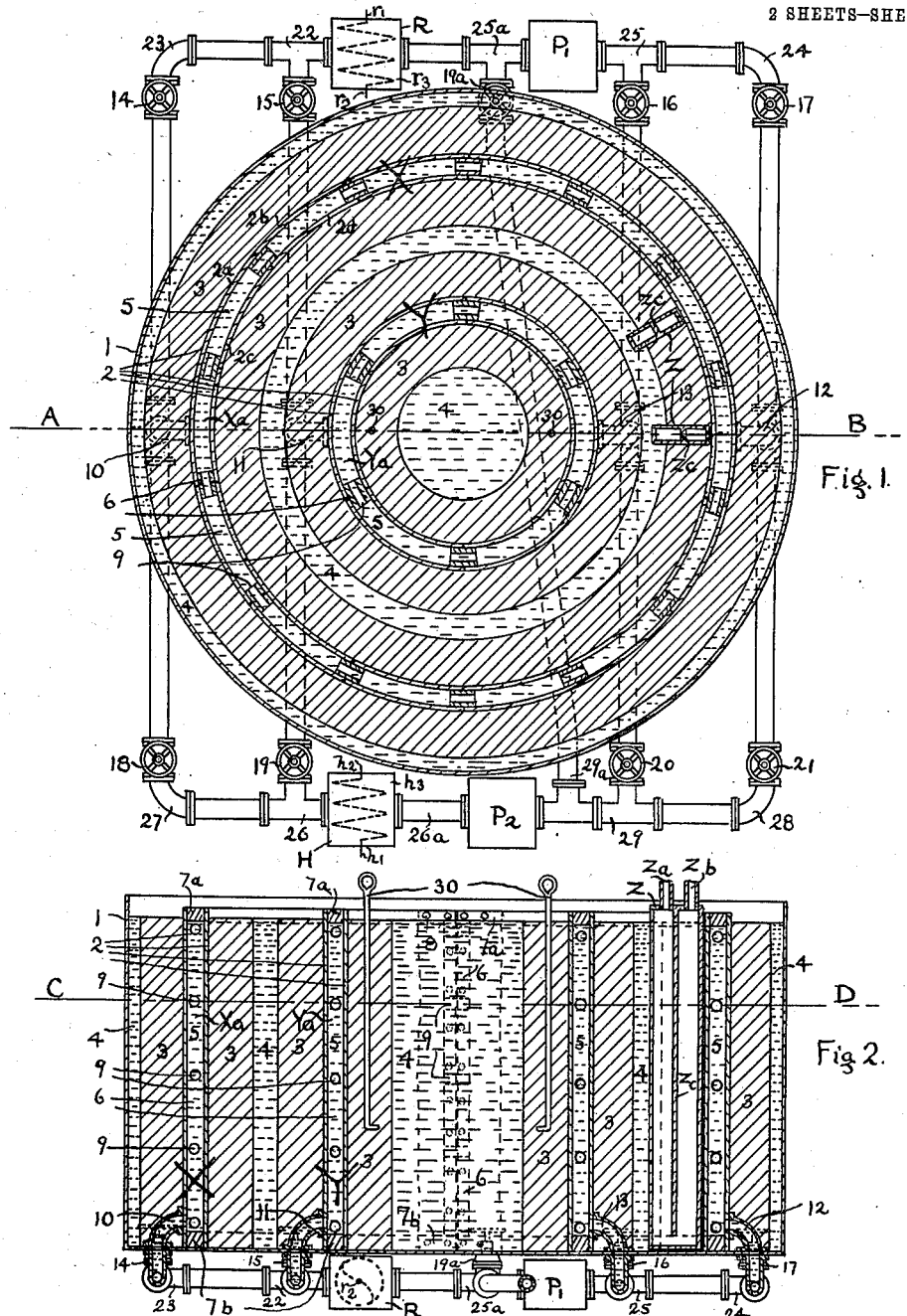
WITNESSES
INVENTOR
Gardner Tufts Voorhees.

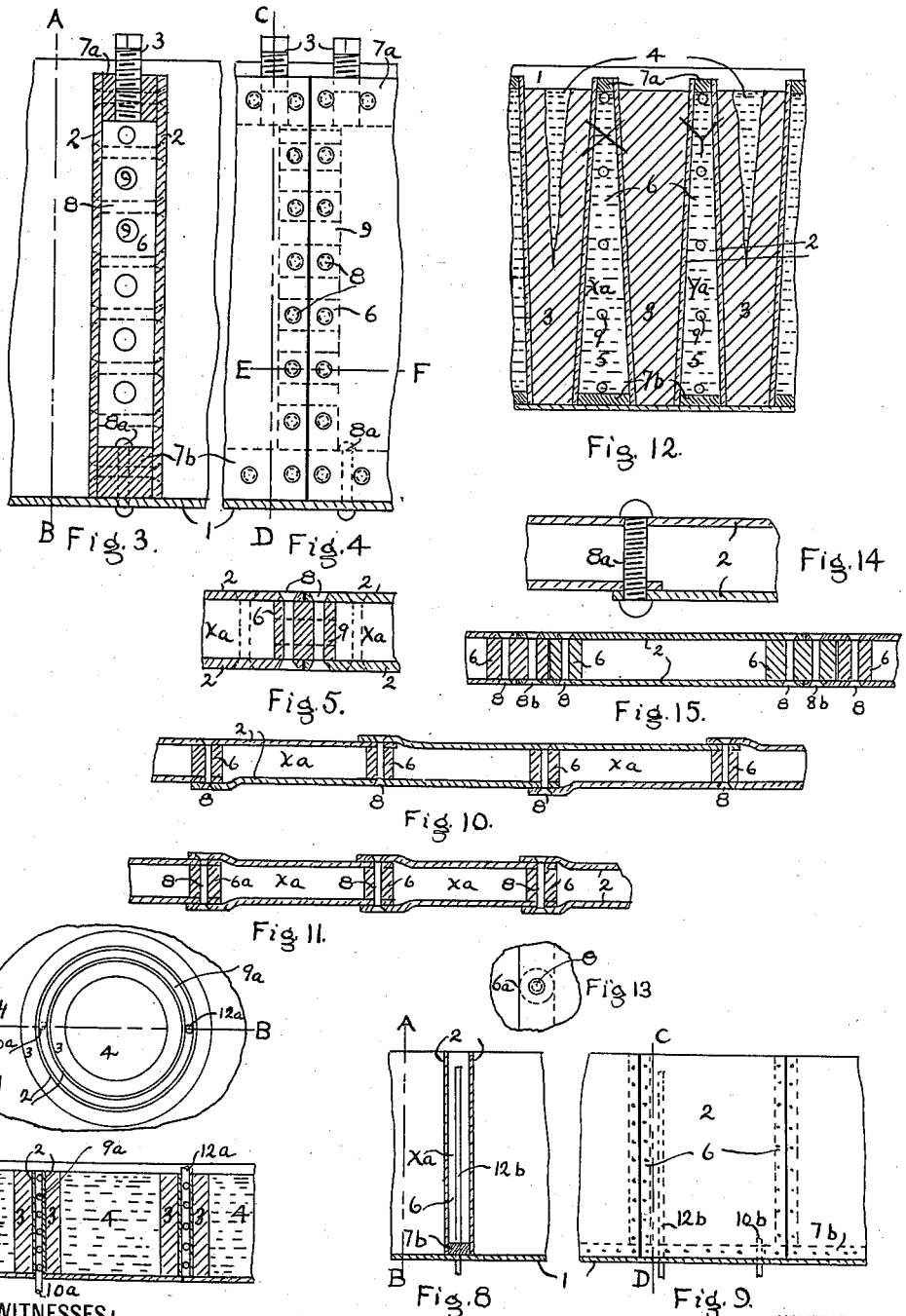

UNITED STATES PATENT OFFICE.

GARDNER TUFTS VOORHEES, OF BOSTON, MASSACHUSETTS.

CONCENTRIC-CIRCULAR-CELL ICE-MAKING APPARATUS.

984,052.   Specification of Letters Patent.   Patented Feb. 14, 1911.

Application filed April 15, 1908. Serial No. 427,136.

*To all whom it may concern:*

Be it known that I, GARDNER TUFTS VOORHEES, residing at Boston, in the county of Suffolk and State of Massachusetts, have invented certain new and useful Improvements in Concentric-Circular-Cell Ice-Making Apparatus, of which the following is a specification.

My invention relates to improvements in ice freezing surfaces.

My new circular ice freezing apparatus consists of two or more pairs of concentric circular freezing surfaces, circular in horizontal cross section, ice being frozen to the surfaces in the form of hollow cylinders or hollow conical frustums.

The principal objects of my invention are, compactness, low cost of construction and economical operation.

My new circular ice freezing apparatus makes large hollow cylinders or hollow conical frustums of ice that can be cut into cakes of any desired shape and weight and has manifold advantages over all forms of can ice or plate ice making devices now known to me.

In the drawings Figures 1 and 2 are sectional views of circular ice freezing cells in a tank adapted to make ice. Fig. 1 is a section on line C, D, of Fig. 2, Fig. 2 is a section on line A, B, of Fig. 1. Figs. 3, 4, 5 are detailed views of the ice freezing surfaces. Fig. 3 is a section on line C, D, of Fig. 4. Fig. 4 is a section on line A, B of Fig. 3. Fig. 5 is a section on line E, F of Fig. 4. Figs. 6 and 7 are modifications of Figs. 1 and 2. Fig. 6 is a part plan and Fig. 7 a section on line A, B of Fig. 6. Figs. 8 and 9 are modified forms of the freezing cell, Fig. 8 is a section on line C, D of Fig. 9 and Fig. 9 is a section on line A, B of Fig. 8. Figs. 10 and 11 are horizontal sections through modified forms of cells, Fig. 12 is a section showing a modified form of cell that may be used in place of the cells shown in Figs. 1 and 2. Fig. 13 shows a modified form of upright 6. Fig. 14 shows a threaded rivet or stay bolt to replace upright 6. Fig. 15 shows a modification where the circular cell is made up of a number of complete cells bolted or riveted together.

In all the figures 1, is a tank, 2 freezing surfaces, 3 ice, 4 water, 5 a cooling or heat transferring fluid.

In Figs. 1, 2, 3, 4, 5; 6 are uprights, 7$^a$ an upper ring, 7$^b$ a lower ring, 8 rivets, 9 holes in uprights 6, 10, 11 supply pipes to cells X, Y; 12, 13 return pipes from cells X, Y; 14, 15, 16, 17, 18, 19, 20, 21 valves, 22, 23 a cooling fluid supply pipe, 24, 25 a cooling fluid return pipe, 26, 27 a heating fluid supply pipe, 28, 29 a heating fluid return pipe. The tank 1 contains the circular cells X, Y that may or may not be riveted to the tank bottom by rivets 8$^a$, Figs. 3 and 4. The cells are made up of the upper ring 7$^a$ and lower ring 7$^b$, uprights 6, and plates 2$^a$, 2$^b$, 2$^c$, 2$^d$, etc., riveted by rivets 8 to the rings 7$^a$ and 7$^b$ and the uprights 6 and to each other; thus forming the cells X and Y with the annular spaces X$^a$ and Y$^a$. 30 are lifting rods that can be frozen into the ice 3. Z are thawing cells adapted to have a heating fluid circulated through them through inlet Z$^a$ and outlet Z$^b$ and down one side and up the other side of partition Z$^c$.

Referring to Figs. 1, 2, 3, 4, 5 the operation is as follows: Tank 1, is filled with water, valves 18, 19, 20 and 21 are closed and a cooling fluid from supply pipe 22, 23 flows through valves 14, 15 and pipes 10 and 11 and into annular spaces X$^a$, Y$^a$ of cells X and Y. The cooling fluid then circulates between the freezing surfaces 2 of the cells and flows through holes 9 of the uprights 6 and after completing a half circle in cells in each horizontal direction the cooling fluid flows from the cells through return pipes 12, and 13, and return valves 16 and 17 and out through return pipe 24, 25. Suitable means are provided whereby the cooling fluid, preferably brine, is pumped by a pump P (of any desired design, driven from any desired source of power) through conduit 25$^a$ from pipe 25 to pipe 22 through a heat removing device R (of any desired design, but here shown as a shell $r_3$ containing coil $r_1$ $r_2$ for the circulation of a heat removing fluid therethrough) to remove the heat that was taken up by the cooling fluid in its passage through the cells X, Y. In passing through the cells X, Y the cooling fluid cools the surfaces 2 and so causes a portion of the water in contact with these surfaces to form into ice 3. This ice is frozen in the form of hollow cylinders (or in Fig. 12 in the form of hollow conical frustums) to the inner and outer circumferences of the cells. When the ice on any cell as X has become of the desired thickness, the circulation of the cooling fluid in that cell is stopped by shutting valves 14, 17, then valves 18, 21 are opened and a heating fluid is circulated through cell X through pipes 26, 27 valve 18 pipe 27, 10 through cell X and out through pipe 12, 28, valve 21 and pipe 28, 29. Suitable means are provided whereby the heating fluid preferably brine, is pumped by pump P₂ (of any desired design, driven from any desired source of power) from pipe 29 to pipe 26 through conduit 26ᵃ and a heating device H (of any desired design but here shown as a shell $h_3$ containing a heating coil $h_1$ $h_2$ for the circulation of a heating fluid therethrough) to add the heat given up by the heating fluid in its passage through cells X, Y. In passing through the cell X the heating fluid causes the ice in contact with the surfaces 2 to thaw, so releasing the ice 3 from the freezing surfaces 2, the ice so formed can now be lifted as one piece from the tank by lifting rods 30 or can be cut into cakes of convenient size and weights by thawing cells Z or their equivalent or by steam cutters of the Pussey type. After the ice has been thawed from the surfaces 2 the circulation of the heating fluid through the cell X is stopped by shutting valves 18, 21, and after the ice has been removed and more water added to the tank the circulation of the cooling fluid is again started by opening valves 14, 17 and so the various cells X, Y, etc., alternately freeze and thaw ice to and from their surfaces. If desired the heating and cooling fluid can be a volatile fluid as ammonia in which case P₁ is a gas pump and also a heating device and R is a means for removing heat and H and P₂ are not used. Here the circulation of cooling water through coil $r_1$ $r_2$ of R condenses ammonia vapor to liquid ammonia in shell $r_3$, which liquid flows through conduit 22, 23 to valves 14, 15, the cooling of the cells X Y being effected by the expansion of the liquid ammonia through expansion valves 14, 15 and its conduction through conduits 23, 10 and 22, 11 to cells X Y and its evaporation in the cells and its exhaust from the cells through conduits 12, 24 and 13, 25 past valves 16, 17 to gas pump P₁ through conduit 24, 25, its compression by said pump and its discharge through conduit 25ᵃ into R wherein it is condensed to a liquid and reconducted through conduit 22, 23 to expansion valves 14, 15. After the ice on cell X is of sufficient thickness, valves 14 and 17 are shut and hot gas from pump P₁ is allowed to flow through pipe 25ᵃ, 29ᵃ past valve 19ᵃ to conduit 29, 28 and thence through valve 21 and conduit 28, 12 into and through cell X wherein it is condensed into a liquid in thawing the ice from frozen contact with the freezing surfaces of the cell and as a liquid is allowed to escape and join the evaporating liquid in cell Y through conduits 10, 27, 27, 26 26, 11 and valves 18, 19.

In Figs. 3 and 4; 31 are plugs that can be removed to admit of cleaning out obstructions that may lodge in holes 9.

Figs. 6 and 7 show a modification where the freezing surfaces 2 are fastened in any desired way to the circular pipe coil 9ᵃ, the cooling and heating fluid being alternately circulated through the coil through inlet 10ᵃ and outlet 12ᵃ.

Figs. 8 and 9 show a modified form of cell where the upper ring of Figs. 3 and 4 is omitted and the uprights 6 are without holes 9 of Figs. 1, 2, 3, 4, and the cooling and heating fluid (here brine only can be used) is circulated through each division of the cell between uprights 6 through a supply pipe 10ᵇ and a return pipe 12ᵇ.

Fig. 10 shows a modified form of riveting the plates that form the surfaces 2 to the uprights 6, here the plates are lapped in place of butted as in Fig. 5, with an extra upright 6 between the vertical edges of each plate.

Fig. 11 shows a modified form of riveting the plates to uprights 6 where the uprights are only at each of the vertical edges of the plates as in Fig. 5 but where the plates forming surfaces 2 are lapped in place of butted.

Fig. 12 shows how all the water between the opposed surfaces 2 can be frozen and removed by having the freezing surfaces inclined so that in the section here shown the ice may, if desired be made from distilled water and has a vertical cross section like that of can ice. The ice so formed is a hollow frustum of a cone and can be cut into cakes that will approximate in shape, size and weight to ice blocks usually frozen in cans.

In Figs. 10 and 11 where the edges of the plates lap, the uprights 6 may be modified into separators in the form of rings like 6ᵃ of Fig. 13, or the separators can be dispensed with by using threaded rivets or stay bolts as shown at 8ᵃ in Fig. 14.

Fig. 15 shows how the circular cell can be made up of a number of complete cells that are bolted together during erection by bolts or rivets 8ᵇ, each section here being riveted and made tight at the shops before shipment.

Although ice formed on my circular cells is circular in horizontal section the departure of the circle from a straight line is not noticeable when the cells are of large diameter and the blocks of ice are cut out of the usual size of say 11 inches thick by 22 inches wide and of any desired depth.

It is well known that circular cells can be made of thinner metal than cells having flat surfaces and with the same areas of stayed surfaces. The outer surface of my cell is like that of a thin cylinder and is subjected to strains similar to those to which a thin cylinder would have from an outward pressure. The inner surface of my cell is subjected to strains similar to those in an arch; so that both the inner and outer surfaces of my cell are stronger than like areas of flat surface of equal depth and consequently will require less material for their construction than similar flat surfaces. The above applies to my cell when full of liquid with no water or ice on its inner or outer surfaces. For equal strength the plates forming the inner surface of my cell should be thicker than those forming the outer surface of the cell.

In the economical construction of the freezing cells it will be evident that the construction shown in Figs. 1, 2, 3, 4, 5 requires the plates to be very accurate and to have true vertical edges and the inner plates have different drilling for rivets from that of the outer plates. The construction shown in Fig. 10 will be more economical as all the plates except one or more making-up plates in each circumference can here be of equal horizontal widths and have like drilling on their vertical edges, while the center row of rivet holes can be drilled during erection if desired. The uprights 6 here forming guides for the drill through their rivet holes. Moreover the vertical edges of the plates in this construction do not require to be trued up and accurate as in Figs. 1, 2, 3, 4, 5.

It will be evident that all the trouble with end thawing as in ordinary rectangular plates or cells is overcome by my circular cell and that with a cell having inclined surfaces like Fig. 12 that a substitute for can ice-making tanks results where no pipe coils or movable cans are required. My tank exposes less outside surface to loss of refrigeration than any other form of tank of the same ice-making capacity. I believe I am broadly entitled to this method of and apparatus for concentric circular ice-making surfaces, and while I have shown various ways of constructing and operating such surfaces, I wish to broadly claim the general principle of freezing ice on and thawing it from the inner and outer surfaces of two or more concentric circular pairs of freezing surfaces.

In the claims when I speak of circular sections, I mean sections that are either circular or approximately so, and when I say concentric, I mean concentric or approximately so, and when I say annular I mean annular or approximately so. It is evident that it will be practically impossible to make the freezing surfaces as true circles, or make them exactly concentric and although I prefer that the freezing surfaces should be approximately circular and concentric, I distinctly mean to cover in the claims all cases of construction whereby the general principle is involved even if the centers of the various freezing surfaces should not coincide or if the freezing surfaces are quite a little out of round, or both.

Claims:

1. In an ice making system a plurality of cells consisting of two circular concentric walls forming freezing surfaces, the walls of each cell having a space between them adapted for the circulation of a heat transferring fluid therein, the opposed freezing surfaces of adjacent cells having an annular space between them adapted for the formation of ice therein, on said freezing surfaces.

2. In an ice making system a plurality of cells consisting of two circular concentric walls forming freezing surfaces, the walls of each cell having a space between them adapted for the circulation of a heat transferring fluid therein, the opposed freezing surfaces of adjacent cells having an annular space between them adapted to hold water to be frozen to said freezing surfaces, conduits to convey the heat transferring fluid to and from said cells, means to cut off the circulation of the heat transferring fluid from any cell.

3. In an ice making system a plurality of cells consisting of two circular concentric walls forming freezing surfaces, the walls of each cell having a space between them adapted for the circulation of a heat transferring fluid therein, the opposed freezing surfaces of adjacent cells having an annular space between them adapted to hold water to be frozen to said freezing surfaces, conduits to convey the heat transferring fluid to and from said cells, means to take heat from the heat transferring fluid.

4. In an ice making system a plurality of cells consisting of two circular concentric walls forming freezing surfaces, the walls of each cell having a space between them adapted for the circulation of a heat transferring fluid therein, the opposed freezing surfaces of adjacent cells having an annular space between them adapted to hold water to be frozen to said freezing surfaces, conduits to convey the heat transferring fluid to and from said cells means to take heat from the heat transferring fluid, means to give heat to the heat transferring fluid.

5. In an ice making system a plurality of cells consisting of two circular concentric walls forming freezing surfaces, the walls of each cell having a space between them adapted for the circulation of a heat transferring fluid therein, the opposed freezing surfaces of adjacent cells having an annular space between them adapted to hold water to be frozen to said freezing surfaces, conduits to convey the heat transferring fluid to and from said cells, means to take heat from the heat transferring fluid, means to give heat to the heat transferring fluid, means to alternately cause the heat transferring fluid to take heat from and give heat to a cell to cause ice to form on said freezing surfaces and to thaw the ice so formed from frozen contact with said freezing surfaces.

6. In a cell for making ice consisting of two circular concentric walls forming freezing surfaces, each wall composed of a plurality of metal plates, a circular metal ring and a plurality of separators between the plates, the plates of each freezing surface being fastened to the opposite circumferences of the circular metal ring at their bottom edges and being fastened to each other and to the separators so forming a space between the freezing surfaces adapted for the circulation of a heat transferring fluid therein.

7. In a cell for making ice consisting of two circular concentric walls forming freezing surfaces, each wall composed of a plurality of metal plates, a circular metal ring, and a plurality of vertical separator strips between the plates, the plates of each freezing surface being fastened to the opposite circumferences of the circular metal ring at their bottom edges and being fastened to the vertical separator strips, so forming spaces between the freezing surfaces adapted for the circulation of a heat transferring fluid therein.

8. In a cell for making ice consisting of two circular concentric walls forming freezing surfaces, each wall composed of a plurality of metal plates, two circular metal rings and a plurality of vertical separator strips between the plates, the plates of each freezing surface being fastened to the opposite circumferences of the circular metal rings at their top and bottom edges, the separator strips extending from the upper ring to the lower ring, the plates being fastened to the separators, so forming spaces between the freezing surfaces adapted for the circulation of a heat transferring fluid therein.

9. In a cell for making ice consisting of two circular concentric walls forming freezing surfaces, each wall composed of a plurality of metal plates, a circular metal ring and a plurality of vertical separator strips, the plates of each freezing surface being riveted to the opposite circumferences of the circular metal ring at their bottom edges, a separator strip at each vertical plate joint of each freezing surface, the vertical joints of the inner and outer sets of plates arranged in staggered relation, the vertical edges of the plates being riveted to the separator strips, so forming spaces between the freezing surfaces adapted for the circulation of a heat transferring fluid therein.

10. In an ice making apparatus, the combination of a tank for holding water to be frozen and a plurality of circular concentric freezing cells located therein, each of said cells being composed of two concentric walls spaced apart so as to form a channel for the circulation of a refrigerant between said walls, said concentric freezing cells being suitably spaced from each other and the outer cell being spaced from the wall of said tank.

In testimony whereof I affix my signature in presence of two witnesses.

GARDNER TUFTS VOORHEES.

Witnesses:
C. A. HUBERT,
A. H. RITTER.